T. S. MOFFETT.
WEEDING IMPLEMENT.
APPLICATION FILED MAR. 20, 1920.
1,348,438.
Patented Aug. 3, 1920.
2 SHEETS—SHEET 1.
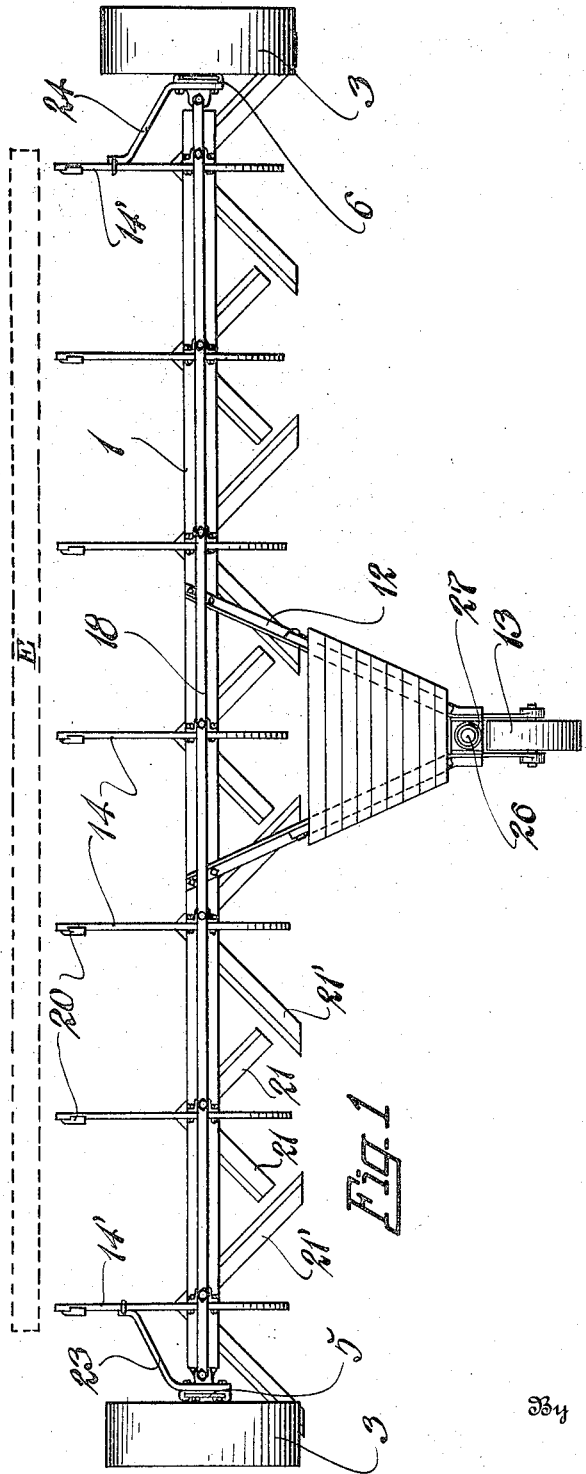
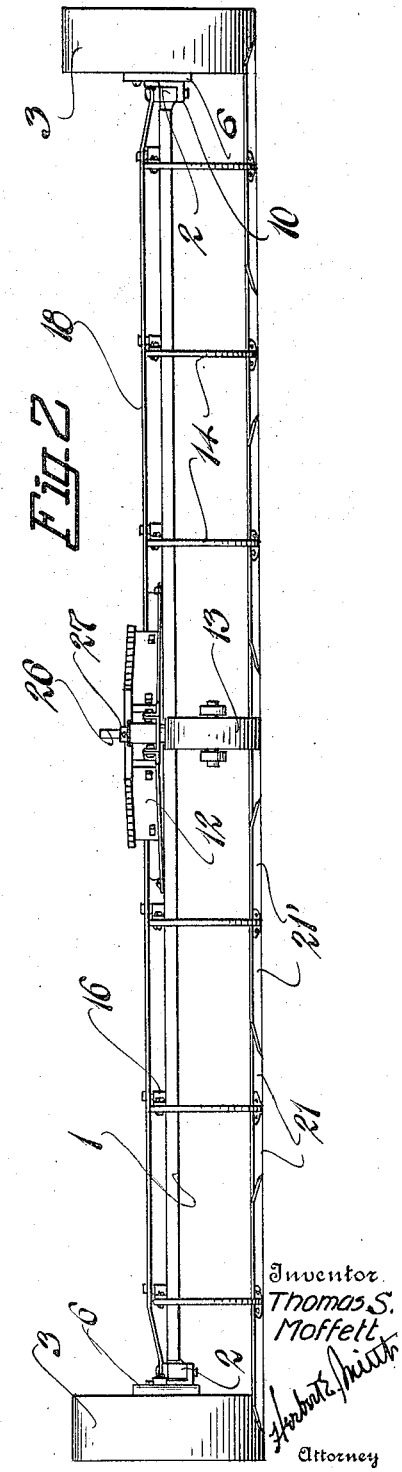
Inventor
Thomas S. Moffett

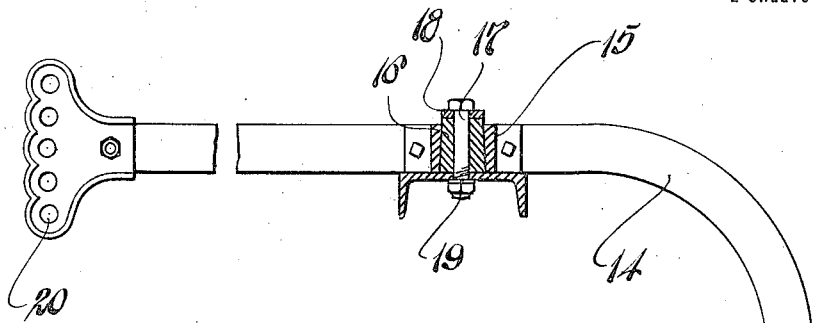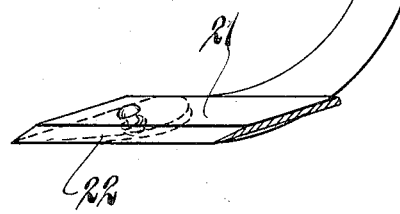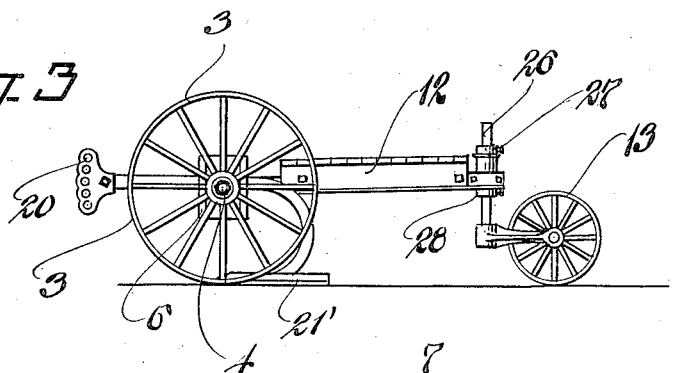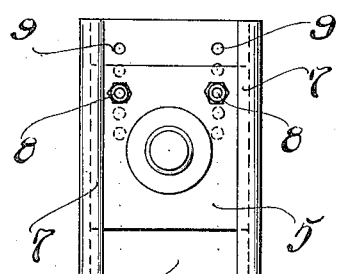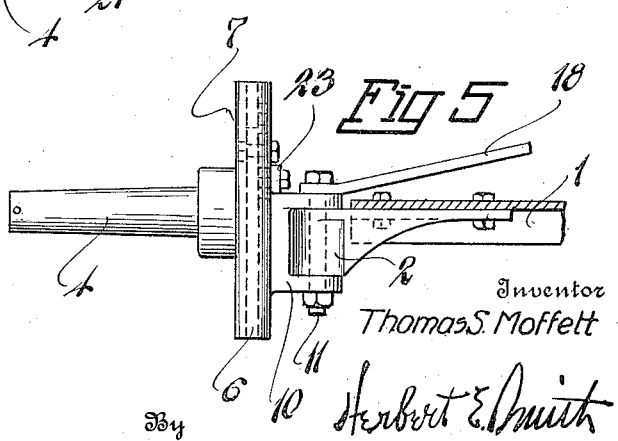

UNITED STATES PATENT OFFICE.

THOMAS S. MOFFETT, OF WALLA WALLA, WASHINGTON, ASSIGNOR OF ONE-HALF TO ARCHIE O. JOHNSON, OF WALLA WALLA, WASHINGTON.

WEEDING IMPLEMENT.

1,348,438.  Specification of Letters Patent.  Patented Aug. 3, 1920.

Application filed March 20, 1920. Serial No. 367,539.

*To all whom it may concern:*

Be it known that I, THOMAS S. MOFFETT, a citizen of the United States, residing at Walla Walla, in Walla Walla county and State of Washington, have invented certain new and useful Improvements in Weeding Implements, of which the following is a specification.

My present invention relates to improvements in weeding implements designed particularly for the purpose of cutting wide swaths and to provide a comparatively long cutting implement that may with facility and ease be turned and guided in its travels, and which is capable of adjustment for cutting the weeds at desired height below or above the ground. To this end the invention consists in certain novel combinations and arrangements of parts involving a supporting member with swiveled end wheels and swiveled or oscillatable blade supporting means movable synchronously with the supporting wheels, and in certain features of construction involved in the implement as will be hereinafter more fully set forth and claimed.

In the accompanying drawings I have illustrated one complete example of the physical embodiment of my invention constructed and arranged according to the best mode I have so far devised for the practical application of the principles of my invention.

Figure 1 is a top plan view of an implement invented by me and exemplifying the conception of my invention.

Fig. 2 is a rear view of the implement of Fig. 1.

Fig. 3 is a view in elevation as seen from the left in Fig. 1.

Fig. 4 is an enlarged detail view of one of the units, including a swiveled beam and cutting blade, the swivel connection being shown in section.

Fig. 5 is a detail view of the stub axle connection at one end of the transverse bolster of the implement.

Fig. 6 is a view as seen from the left in Fig. 5 showing the adjustable stub axle and its supporting bracket by means of which the altitude of the cutting implement is varied.

In the preferred form of the invention as illustrated in the drawings I utilize a metallic bolster 1 fashioned of channel iron for strength and lightness in weight, and at the respective ends of the bolster are attached vertically arranged bearing blocks 2, 2, for support of the traction wheels 3, 3, which are shown as of considerable width of tread surface and alined with the longitudinal axis of the transverse bolster 1 forming the main portion of the supporting frame of the implement.

The wheels of the implement are journaled on stub shafts 4, 4, that are provided with rigid or integral upright plates 5, 5, which co-act with vertical brackets 6, 6, all of metal and of the required size and strength, the brackets being fashioned with side flanges 7, 7 for retaining and guiding the rectangular stub-axle-plates as best seen in Figs. 5 and 6.

The brackets are adjusted with relation to the plates and held in adjusted position by means of the securing bolts 8, 8 passed transversely through the plates and brackets that are perforated at 9 for the purpose, and it will be apparent that the pair of bolts for each adjustable connection at the ends of the bolster, will co-act with the flanged bracket to hold the axle plate in rigid and close relation to the bracket to provide a secure joint.

The stub axle or journal for the wheel, projects longitudinally from the axle plate, and the wheel is secured on the journal in usual and suitable manner. At the inner side of each of the wheel brackets is fashioned a rigid or integral yoke 10 having its arms perforated with vertically alined openings to receive the bolt 11, which as seen in Fig. 5 is passed through the bearing block 2 and through the perforated yoke to permit the stub axle and wheel thereon to swing with relation to the bolster with the bolt 11 as a center. Each end of the bolster is thus equipped with an oscillatable wheel support by means of which the implement may be steered or guided, and the rear frame 12 of the implement attached to the transverse bolster, is supported on the caster wheel 13, which, as usual is swiveled, to follow the travel of the guided implement.

In conjunction with the transverse bolster, I utilize a series of spaced beams 14, disposed above the bolster and normally transverse thereto *i. e.* arranged with their longitudinal axis in the line of travel of the implement. These beams are located equidistant with relation to one another and are swiveled to swing laterally with relation to the implement through the instrumentality of the socket members 15 bolted at one side of each of the beams, and these socket members are seated over the rigid heads 16, preferably slightly tapered, and located on the central longitudinal axis of the channel iron bolster 1. The beams may swing with relation to the bolster through the socket and head connection, and the connection is completed by means of the bolt 17 passed vertically through the perforated head and through a bolt opening in the channel iron bolster, a bridge bar 18 and nut 19 being utilized to close said connection.

The bridge bar, it will be noted, is a long flat metal plate extending the full length of the bolster and parallel therewith, and rests upon the spaced heads to which it is secured by the vertical bolts 17, its ends being bent down to the plane of the bolster as seen in Fig. 2 and secured thereto, thus forming a brace for the swiveled connections of the beams with the bolster, and also bracing the bolster.

At their forward ends the beams are equipped, each with a clevis 20, and flexibly connected with an equalizer or evener to which the draft appliance is attached, the evener being indicated in dotted lines in Fig. 1 at E, in order that the series of beams may swing in unison as the implement is guided.

Each beam carries a rigidly attached V-shaped cutting blade as 21, 21' disposed in horizontal position above the ground to be effective in cutting weeds and provided with beveled cutting edges 22. In Fig. 1 it will be noted that the blades 21 are shorter than the diverging blades 21' and alternate therewith, in order that a continuous cutting edge may be presented to the field to be cut by the blades, and to permit the knives to clear themselves and pass the cut weeds to the rear to prevent clogging or piling up of the cut weeds.

It is essential that the supporting wheels 3 and the swiveled or pivoted beams co-act as the implement is turned or guided, and to this end the brackets 23 and 24 are utilized to connect the respective wheels with the respective end beams of the implement. The brackets or arms 23, 24 are firmly attached, as by bolts or rivets to the fixed brackets 6, and are bent inwardly toward the nearest beam so that their forward, free ends may have a sliding connection with the beams 14' at the ends of the bolster through the loop or slide piece 25 carried by the free end of the bracket arm and slidable on the beam 14'.

Thus it will be apparent that when the horses that are hitched to the equalizer or evener are turned to right or left all of the beams and the two wheels will be turned in the same direction and synchronously facilitating the turn to be made and insuring a continuous cutting operation of the cutting blades.

To adjust the cutting blades with relation to the ground, for cutting various types of weeds, or to elevate the operative part of the implement to inoperative position, recourse is had to the adjustable wheel brackets and axle plates, and it will be apparent that the brackets may be elevated or lowered as desired, with relation to the plates, and the bolts 8 passed through and secured in the selected holes of the vertically arranged series, the movement of the brackets with relation to the plates being guided by the flanges of the brackets. In connection with the adjustment of the bolster, the frame 12 may also be adjusted on the spindle 26 of the caster wheel by releasing and tightening the set collars 27 28 on the spindle in manner well understood.

From the above description taken in connection with my drawings it will be obvious that I have provided an implement capable of cutting a wide swath, and which is readily guided and steered in its travels, being assisted in this movement by the facile movement of the cutting blades and supporting wheels.

What I claim is—

1. The combination with a bolster having pivoted stub axles and end supporting wheels, of a series of draft beams swiveled on the bolster and carrying cutter blades, and braces having fixed relation to the stub axles and slidable connections with the respective end beams, whereby the wheels and beams are turned synchronously.

2. In an implement as described, the combination with a supporting bolster having a perforated head thereon, of a draft beam having a socket member horizontally swiveled on the head, and a securing bolt passed through said bolster and head for the purpose described.

3. In an implement as described, the combination of a bolster having spaced, perforated heads secured thereon, of a series of draft beams having sockets swiveled on said heads, a bridge bar parallel with the bolster and engaging said heads, and securing bolts passed through said bar, heads and bolster for the purpose described.

4. In an implement as described, the combination with a bolster having swiveled stub axles and supporting wheels, and provided with spaced perforated heads, of a series of draft beams having socket members swiveled on said heads, means operatively connecting the end beams with the wheel supports, a bridge bar above said heads, securing-bolts for the bar, heads and bolster as described, and alined cutting blades on said beams, for the purpose described.

In testimony whereof I affix my signature.

THOMAS S. MOFFETT.